United States Patent [19]
Anjier

[11] 4,305,913
[45] Dec. 15, 1981

[54] ALUMINA HYDRATE PRODUCTION FROM BAYER LIQUOR BY SEEDING

[75] Inventor: Joseph L. Anjier, Baton Rouge, La.

[73] Assignee: Kaiser Aluminum & Chemical Corporation, Oakland, Calif.

[21] Appl. No.: 175,816

[22] Filed: Aug. 6, 1980

[51] Int. Cl.³ .............................................. C01F 7/06
[52] U.S. Cl. .................................... 423/123; 23/301; 23/305 A; 423/121; 423/124; 423/127; 423/629
[58] Field of Search ............... 423/121, 123, 124, 127, 423/629; 23/301, 305 A

[56] References Cited
U.S. PATENT DOCUMENTS

| | | | |
|---|---|---|---|
| 1,943,786 | 1/1934 | Cowles | 423/127 |
| 3,545,923 | 12/1970 | Mercier et al. | 423/127 |
| 3,649,184 | 3/1972 | Featherston | 423/629 |
| 4,014,985 | 3/1977 | Haleen et al. | 423/629 |
| 4,049,773 | 9/1977 | Mejdell et al. | 23/305 A |
| 4,234,559 | 11/1980 | Tschamper | 423/121 |

FOREIGN PATENT DOCUMENTS

| | | | |
|---|---|---|---|
| 468717 | 3/1974 | Australia | 423/127 |
| 2807245 | 5/1979 | Fed. Rep. of Germany | 423/127 |

*Primary Examiner*—Herbert T. Carter
*Attorney, Agent, or Firm*—Paul E. Calrow; Andrew E. Barlay

[57] ABSTRACT

A precipitation system is provided for the production of strong, coarse alumina hydrate ($Al_2O_3.3H_2O$) from Bayer process aluminate liquors. In the system three distinct, but interconnected processing stages are utilized which comprise an agglomeration stage, a growth stage and a seed generation stage. In the agglomeration stage hydrate particles agglomerate to form coarse particles; in the growth stage these particles grow and acquire strength; while in the seed generation stage alumina hydrate seed is generated to be used in the agglomeration and growth stages.

The precipitation system combines the advantages of both the American and European Bayer processes in that it results in the production of a strong, coarse product hydrate and an increased yield.

5 Claims, 6 Drawing Figures

THREE STEP PRECIPITATION PROCESS

ALUMINA HYDRATE PRODUCTION FROM BAYER LIQUOR BY SEEDING

BACKGROUND OF THE INVENTION

This invention relates to the production of coarse, strong alumina hydrate particles from pregnant Bayer liquor. Specifically, the invention provides a precipitation system of several stages wherein each stage has a predetermined function and the combined and cooperative effects of these stages result in the production of coarse, strong alumina hydrate particles in high yield.

In the well-known Bayer process of alumina hydrate production, alumina-containing ores, such as bauxite, are digested with an alkaline solution. Digestion is carried out at high temperatures and pressures and it results in the generation of a supersaturated or "pregnant" liquor containing the alumina values of the ore. From this liquor the alumina values are usually recovered by precipitation. A detailed description of the conventional Bayer process can be found in "The Chemical Background of the Aluminium Industry" written by T. G. Pearson and published by The Royal Institute of Chemistry, G. Britain, as "Monograph No. 3, 1955."

It has long been the aim of Bayer process operators to precipitate as much alumina hydrate as possible from the pregnant liquor in order to maximize the efficiency of the process. It is also a goal in the Bayer process to obtain coarse, strong alumina hydrate particles in the precipitation step. If the hydrate particles are fine and weak, considerable problems will arise in the subsequent hydrate processing steps and in particular in the calcination stage where fineness results in significant dust generation and handling losses. Also, if the calcined fine alumina hydrate is used in the electrolytic production of aluminum, fineness can cause further processing difficulties, for example, in dry scrubbing of reduction cell offgases. Consequently, it has been a major consideration in the Bayer process particularly since the inception of these dry scrubbing processes to produce coarse, strong alumina hydrate particles in high yield.

In practice however these two objectives could not be achieved simultaneously. Either coarse alumina hydrate is produced at a reduced yield or in the alternative, a fine alumina hydrate is generated but in yields exceeding the ones obtained in the production of coarse alumina. Although both the coarse and the fine alumina hydrate can be calcined to the "sandy" or to the "floury" state, which expressions are well-known to Bayer process operators, in accepted plant operating practices coarse alumina is almost always calcined to the "sandy" state; while the fine alumina hydrate is generally calcined to the "floury" state to minimize product dusting and losses.

Based on the foregoing operating principles two distinct Bayer process operations evolved over the times.

The Bayer process based on the production of coarse alumina hydrate at lower yields is extensively practiced in the United States and is commonly referred to as the "American Bayer Process". In the American Bayer process, the coarse alumina hydrate is obtained by extracting the alumina values from bauxite with a caustic solution which has a sodium hydroxide concentration in the range of about 165 g/l to 190 g/l expressed as $Na_2CO_3$ equivalents. The alumina ($Al_2O_3$) content of the produced sodium aluminate solution is usually kept within the range of about 99 g/l and 135 g/l to obtain an alumina to caustic ratio (A/C) within the range of about 0.600 and 0.700. These concentration limits, coupled with the control of the temperature conditions and the seed quantity added to precipitate alumina hydrate, result in the production of a desirable sandy alumina hydrate product but at the cost of yield. Additionally, the "spent" liquor, that is, the liquor obtained when the alumina hydrate which precipitated is removed from the residual solution, is relatively dilute. Consequently, more energy is required to concentrate the spent liquor because more weight of liquor is being circulated with about the same loss of heat per unit of weight circulated. Also, more capital equipment is required due to the larger weight of liquor being circulated.

In Europe the energy-intensive nature of the Bayer process has long been recognized. Consequently, in Europe the Bayer process is practiced in a modified form which is generally referred to as "European Bayer Practice". In the European Bayer practice significantly higher caustic concentrations are used for the digestion of aluminous ores, generally in the range of about 220 g/l to 300 g/l. The spent liquor resulting from the precipitation step is more concentrated than the spent liquor of the American Bayer practice and thus requires less energy. Also, due to the use of the higher caustic levels in digestion, the quantity of alumina which can be dissolved by a unit volume of caustic is also higher. Further, the A/C ratios of European pregnant Bayer liquors is generally lower than those found in the American Bayer practice and are usually in the range of about 0.575 to 0.625. Although the European Bayer practice uses less energy per unit weight of alumina hydrate produced and also results in higher yields due to the higher alumina concentrations of the generated pregnant liquor, this process also has its definite disadvantages. These disadvantages are associated with the recycling of large quantities of alumina trihydrate seed and the production of a fine alumina hydrate during the precipitation step which then must be highly calcined to the "floury" state to make it less dusting. This fine, highly calcined alumina causes significant dusting problems because of its fineness and it cannot be utilized for the dry scrubbing of the offgases generated in the reduction process. Also, the fine floury alumina is not free flowing and therefore cannot be readily charged to reduction cells as feed.

Considering the advantages and disadvantages of both types of Bayer practices it becomes clear that it would be of great importance to provide a Bayer process which would result in a strong, coarse alumina hydrate in high yield and in addition achieve a reduced energy input per unit weight of hydrate produced. Since both the American and European Bayer processes have been practiced for many decades, it is only natural to assume that such a "combination" process has been developed. The published art in the Bayer process treatment of aluminous ores, however, indicates that most of the attempts were made to improve the individual processes rather than finding a process which would incorporate the advantageous features of both without the accompanying disadvantages.

In the following a representative sampling of the published "Bayer Process" patents is provided to indicate the state of the art with particular emphasis on precipitation techniques. The "American Bayer Process" and improvements thereto are shown in the following: U.S. Pat. Nos. 1,943,786 (Cowles), 2,653,858

(Brown), 2,707,669 (Houston et al), 3,486,850 (Day), 3,649,184 (Featherston) and 4,014,985 (Haleen et al) and British Pat. No. 1,045,216.

The European Bayer practice is represented by the following art: U.S. Pat. Nos. 3,480,388 (Michel), 3,545,923 (Mercier et al) and also by German Offenlegungsschrift 2,531,646 (Tielens et al—published Feb. 3, 1977), German Pat. No. 2,030,732 (Ferenc et al—granted Nov. 10, 1977) and German Offenlegungsschrift 2,623,482 (Schepers—published Dec. 8, 1977).

The instant invention provides a precipitation scheme which results in the production of the desired strong, coarse alumina hydrate at a significantly increased yield with a simultaneous reduction in the energy input required to produce the alumina hydrate. This is achieved by employing the high caustic concentration generally utilized in the European Bayer practice in combination with a three-stage precipitation system, wherein although each stage has a separate and distinct function, these stages are integrally associated. In the following a detailed description of the functions and operational characteristics of the novel system is provided.

BRIEF SUMMARY OF THE INVENTION

An improved Bayer process precipitation system is provided wherein coarse, high strength alumina hydrate particles are produced at an improved yield. The system consists of three stages wherein one stage of the system, the "Agglomeration" section is employed for the production of agglomerates, another stage, the "Growth" section is utilized to impart strength and increased size to the agglomerates produced in the "Agglomeration" section; while the third or "Seed Generation" stage is used to produce alumina hydrate seed in high yield. This seed is classified and the coarse fraction of the produced hydrate is then employed in the "Growth" section as seed, while the fine fraction generated is used as seen in the "Agglomeration" section. The instant precipitation system can combine the advantages of the "European" type Bayer process, i.e., high yield of alumina hydrate and low energy consumption, with the advantages of the "American" type Bayer process consisting in the production of a coarse alumina hydrate product. The instant precipitation system can be operated in a batch or continuous manner at A/C ratios of 0.575-0.700, at caustic concentrations between the limits of 165-300 g/l, expressed as g/l $Na_2CO_3$, and at average holding times for the different stages of about 5-24 hours. The yield of strong, coarse alumina hydrate resulting from the process is within 75-80 g/l and provides a significant improvement over conventional Bayer process precipitation systems. The product alumina hydrate exhibits high attrition resistance and its particle size distribution is such that at least 90% by weight of the particles have a size in excess of 45 microns.

BRIEF DESCRIPTION OF THE DRAWINGS

FIG. 4 provides scanning electron micrographs depicting the change in alumina hydrate particle size and appearance through the three stages of the instant precipitation system.

DETAILED DESCRIPTION OF THE INVENTION

This invention relates to the production of strong, coarse alumina hydrate particles in high yield from Bayer process liquors. More particularly, it concerns a precipitation system consisting of multiple stages wherein each stage has a predetermined function and wherein the combined effect of the stages results in the production of strong, coarse hydrate in high yield. In the precipitation system of the invention a stage is provided wherein alumina hydrate precipitates from pregnant Bayer liquor or seed particles and form agglomerates of coarse particle size under predetermined and controlled conditions. In another stage of the system alumina hydrate precipitates from pregnant Bayer liquor on coarse seed agglomerates causing growth under controlled conditions; and a further precipitation stage in which fine alumina particles are precipitated in high yield and then these fine particles are recycled as seed to the other stages.

For the purposes of the invention the term "Agglomeration" means a crystallization step wherein alumina hydrate particles collide and are cemented together with newly precipitated alumina to form a larger particle. As used herein the term "Growth" relates to a crystallization step where agglomerated hydrate particles are further enlarged and strengthened by the deposition of newly precipitated alumina hydrate on the agglomerate.

The term alumina to caustic ratio or A/C refers to the quantity of $Al_2O_3$ in grams/liter dissolved in a caustic solution, wherein the caustic solution is expressed in $Na_2CO_3$ grams/liter.

The term "sandy" alumina as used herein refers to alumina obtained by calcination of alumina hydrate at elevated temperature and possessing an angle of repose of less than 40°, usually below about 35°. The term "floury" alumina relates to an alumina obtained by calcination of alumina hydrate at elevated temperature and possessing an angle of repose in the range of about 40°-50°.

Sandy alumina is, under usual circumstances, a fairly uniform free flowing powder, while floury alumina is a poorly flowing or nonflowing powder containing a significant proportion of fine feathery crystalline material. Angle of repose, as used herein for the definition of the calcined alumina made from the alumina hydrate, is determined by the resistance of the calcined alumina grains to sliding or rolling over each other. Its determination is described in detail on Page 220 of Volume 1 of "Extractive Metallurgy of Aluminum" (Interscience Publishers New York 1963). From the above description of the calcined aluminas it can be readily observed that for problem-free handling those calcined aluminas, which have an angle of repose of less than 40°, are preferred.

In the process of the present invention the pregnant liquor utilized in the precipitation system is generated by digestion of bauxite. The bauxite employed in digestion can be of any source, for example bauxite of U.S., Caribbean, European, Australian, South American or African origin can be equally utilized. The digestion of the bauxite is accomplished in the conventional manner using the temperatures and pressures commonly employed either in the American or in the European Bayer practice. As far as the A/C ratios and caustic concentrations are concerned, the precipitation process of the instant invention is not limited to either the European or American Bayer process practice conditions. Rather, the entire A/C range of from about 0.575 to 0.700 can be utilized at caustic concentrations encompassing the ranges employed by both practices, e.g., from about 165 g/l to about 300 g/l, expressed in $Na_2CO_3$ grams/liter.

After completion of the digestion of the bauxite and separation of the insoluble residue, the pregnant liquor, containing the dissolved alumina values in the form of sodium aluminate, can be employed for the recovery of these values by the process of the instant invention.

Figure 1:
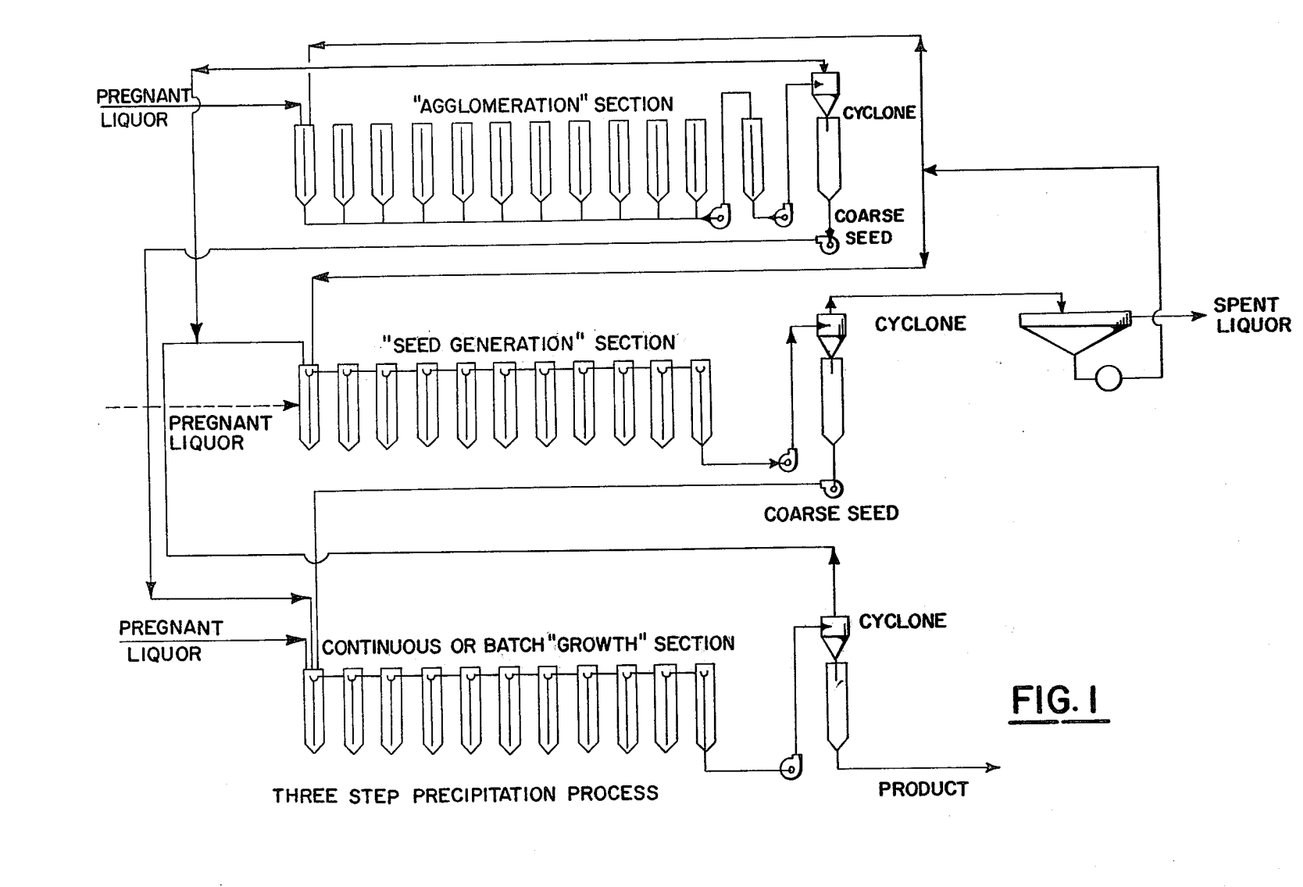
FIG. 1 schematically shows a preferred embodiment of the instant three-stage precipitation system. The solid lines indicate the flow of liquor streams and products, while the dotted lines show possible variations thereof and/or additions thereto.

For better understanding of the functioning of the instant multi-stage precipitation system and the operating characteristics of each distinct stage therein, frequent reference is going to be made to the accompanying FIG. 1. It is to be understood, however, that the flowsheet of FIG. 1 is provided for illustrative purposes only, any reference thereto is not intended as a limitation as to the scope of the present invention.

Agglomeration Stage

Pregnant liquor obtained from digestion is introduced into a series of precipitation vessels of conventional design. As shown in the Figure under the section designated as "Agglomeration" section each vessel is equipped with an agitation means which can either be a mechanical stirrer or a conventional airlift which allows suspension of the contents of the vessel. The number of the vessels in this "Agglomeration" section or stage depends on the size of the vessels employed and also the production capacity not only of the digestion system, but also the entire Bayer plant. Although the "Agglomeration" shown in FIG. 1 depicts a batch operation system, it is to be understood that this stage of the system can also be operated in a semi-continuous or continuous manner. The choice of operational mode remains within the discretion of the Bayer process plant operator and is generally limited only by capital cost considerations.

After filling each precipitator vessel of the batch-type "Agglomeration" stage with pregnant liquor, alumina hydrate seed is charged to the vessels to induce precipitation. Since the function of the "Agglomeration" stage is to generate alumina hydrate particles of a desired size, generally to obtain a yield of more than about 90% by weight of particles having a size in excess of about 0.045 mm (45 microns), several process variables must be controlled. The most important process variables which affect the agglomeration of hydrate particles include the A/C ratio, the temperature, agitation and the quantity of seed charged to the precipitator vessels. Since the process of the instant invention can be readily applied to both the American and European Bayer practice, the A/C ratio of the pregnant liquor can vary within the limits of 0.575 and 0.700. Due to this variation, the fill temperature, e.g., the temperature which exists in the precipitator vessels after the seed charge is added to the pregnant liquor, must also be adjusted within the temperature range of about 74° C. and 85° C. to such a temperature which favors the optimum agglomeration when a seed charge is added to the precipitation vessel. The amount of seed required to induce precipitation and to favor agglomeration is generally determined by experimentation, however, it has been found that it usually lies within the range of about 70 g/l and 140 g/l for the A/C ratios given above and for the fill temperature range described.

Subsequent to the charging of the seed to the vessels, the precipitators are held at the fill temperature for a period of 8–24 hours under agitation. Again, for purposes of optimization of the holding period, it is possible, for example, to plot the particle number decrease in the vessel as a function of time. Thus, for example, by using the particle number versus time plot, it has been found that optimum agglomeration could be achieved in about eight hours in a system having an A/C ratio of 0.685 and a temperature of about 80° C. at a seed charge of about 70 g/l.

After the desired holding time the contents of each of the vessels are introduced into a classification system where the coarse particles, e.g., the agglomerates, are separated from the finer particles. The type of classification system utilized is within the choice of the operator and can consist of conventional equipment, for example, a hydrocyclone. From the classification system the coarse agglomerated particles, which have the desired size but still exhibit friability, i.e., attrition during calcination, are introduced as seed into the next or "Growth" stage of the precipitation system of the invention. The liquor containing the finer particles and having a reduced A/C ratio is utilized in another stage of the system to be discussed in detail later.

It is to be understood, that in the event a continuous mode of operation is employed in the "Agglomeration" stage of the instant process, the pregnant liquor containing the seed particles is transferred from vessel to vessel in the series and the coarse agglomerate is removed from the last vessel of the series to a classification system. If a continuous mode of operation is utilized, it is also possible to introduce seed into all or into selected vessels of the series to obtain higher yields.

Growth Stage

As mentioned aforehand, although the "Agglomeration" section or stage produces a product of desired size, the product itself is not strong enough to survive the rigorous conditions existing during calcination without significant attrition. Attrition creates fines, which as already mentioned above, generate severe processing problems and decreases the usefulness of the alumina product, particularly when used for scrubbing of reduction cell offgases. Consequently, it is the function of the "Growth" stage of the precipitation system of the invention to strengthen the coarse agglomerates produced in the "Agglomeration" stage.

In the "Growth" stage of the instant precipitation system the voids in the coarse agglomerates are filled by crystallization of alumina hydrate from solution and a "cementing" action takes place which provides the coarse agglomerates with strength to survive the subsequent treatment and use. As shown in FIG. 1, a series of agitated precipitation vessels are provided in the "Growth" section of the system. These vessels can operate either in a batch or in a continuous manner. Pregnant liquor is introduced into the vessels and as seed for precipitation the coarse agglomerates generated in the "Agglomeration" and "Seed Generation" sections are used. The A/C ratio of the liquor introduced to this section is the same as in the "Agglomeration" section since it comes from the same source, e.g., digestion, thus it can vary within the range of 0.575–0.700. In this "Growth" section or stage the process variables to be controlled for optimum results include, just as in the case of the "Agglomeration" stage, the fill temperature, the seed charge and the holding time. It has been found that for optimum results the fill temperature should be kept within the same range as in the "Agglomeration" section, e.g., in the range of about 74° C. and 85° C. Since the function of the "Growth" stage of the instant precipitation system is to provide a "cementing" substance within the coarse agglomerates and to fill the voids existing in the coarse agglomerates generated in the "Agglomeration" stage, the seed charge can be increased to generate more precipitated alumina hydrate. It has been found that to establish optimum growth conditions in this stage the seed charge can be varied within the range of about 120 g/l and about 300 g/l depending on the A/C ratio and the selected fill temperature. It has been further found that holding times, within the range of about 8–24 hours at the fill temperature, provide the desired growth and cementing action and results in the generation of a strong, coarse alumina hydrate product. To establish the optimum seed charge and holding time conditions in the "Growth" stage of the instant precipitation system in relationship to the A/C ratio of the pregnant liquor charged to this section, it is possible to experimentally determine the decrease of the numbers of particles resulting from precipitation from the pregnant liquor, as a function of time and at a constant, predetermined fill temperature. These plots can be readily prepared for any desired process condition and can then be applied for establishing predetermined operating parameters for the optimal operation of the precipitation system within the ranges of variables given hereinbefore.

Subsequent to the formation of the strong, cemented coarse particles in the "Growth" section of the instant precipitation system, in case of a batch process, the contents of each precipitator vessel are transferred to a classifier where the coarse particles are separated from the liquor and are then processed, for example, washed, dried and calcined to $Al_2O_3$. In a continuous type system the coarse cemented particles are usually collected in the last vessel of the precipitator vessel series andd then subjected to classification.

Regardless whether a batch or a continuous "Growth" section is utilized for the generation of strong, cemented coarse alumina hydrate particles, the liquor resulting from the classification-separation step and containing finely divided hydrate particles, is introduced, as indicated in FIG. 1, to the third or "Seed Generation" stage of the present invention.

As mentioned hereinbefore, the "Seed Generation" stage of the instant precipitation system is supplied with at least one liquor stream containing finely divided alumina hydrate particles. These can be selected from the "Agglomeration" stage or from the "Growth" section. If desired, both streams can be utilized. These streams have an A/C ratio within the range of about 0.450–0.500 due to the removal of a portion of their alumina content by precipitation in the "Agglomeration" and "Growth" stages.

The function of the "Seed Generation" stage of the instant system is to produce alumina hydrate particles at a maximum yield from the liquor to be employed as seed in the other two sections or stages of the precipitation system. To obtain the desired result the temperature and holding time in this stage are to be controlled in such a manner as to establish conditions to produce seed, increase yield and at the same time reduce particle number. The liquor introduced to the "Seed Generation" stage has generally an A/C ratio which is substantially lower than the A/C ratio in the original pregnant liquor. Thus, in order to obtain the degree of supersaturation conducive to precipitation of the maximum quantity of alumina hydrate from this combined liquor and to maintain the conditions for particle size control, it is necessary to maintain the temperature within the range of about 57° C. and 66° C. at holding times within the limits of about 6–24 hours. Optimization of the operating conditions can be established in the same manner as shown for the other precipitation stages discussed hereinbefore.

In addition to the liquor streams transferred from the "Agglomeration" and "Growth" stages to the "Seed Generation" section, it is also possible to charge pregnant liquor from digestion to this stage. This possibility is indicated by the dotted line in FIG. 1. In this event, since a liquor of higher A/C ratio is introduced, it may be necessary to adjust either the fill temperature or the holding time or both to arrive at the optimum processing conditions. Again, as mentioned before, plotting the variables to establish the desired operating parameters aids in the optimization of the system.

The precipitated alumina hydrate obtained in the "Seed Generation" section has a fairly wide particle size distribution with a shift towards the finer particles. During holding, however, conditions are established to accomplish some agglomeration and growth thus increasing the fraction of coarser particles. Consequently, it becomes advantageous to subject the produced alumina hydrate to classification. The fine alumina hydrate, which is separated from the coarser product, can be preferably recycled as shown in FIG. 1 to the "Agglomeration" and "Seed Generation" sections as seed; while the coarse fraction, which still lacks the desired strength, can be introduced into the "Growth" stage where cementing takes place with corresponding strength increase. The liquor obtained from this "Seed Generation" section, due to the large quantity of hydrate precipitated, will have an A/C ratio below 0.400, generally in the range of 0.280–0.350 which is significantly lower than the A/C ratio of the liquor charged to this section. This reduction in A/C ratio contributes to the overall yield of product recovered and provides a yield which corresponds to the ones achieved in the production of "European" floury alumina.

From the above description it can be clearly observed that the instant precipitation system combines the best features of the European and American Bayer process. In particular the "Seed Generation" section results in the production of alumina hydrate in yields corresponding to those obtained in the European Bayer practice, while the "Agglomeration" and "Growth" stages produce strong, coarse alumina hydrate particles in high yield from the hydrate generated in the "Seed Generation" section. Thus, the instant invention not only results in increased yield of alumina hydrate of the desired particle size, but the product also exhibits the desired strength properties (i.e., attrition resistance during calcination and subsequent use).

The following examples, which are provided to illustrate the invention, are given to further facilitate the understanding of the operation of the present precipitation system.

EXAMPLE I

Pregnant liquor, resulting from the digestion of Jamaican bauxite having the typical composition shown in the Table, was used in demonstrating the precipitation system of the present invention. The digestion effluent containing the dissolved alumina values in the form of sodium aluminate and the insoluble residue (red mud) was subjected to a separation treatment to recover the pregnant liquor.

TABLE

Typical Composition of Jamaican Bauxite

| Component | % by Weight |
| --- | --- |
| $Al_2O_3$ (total) | 48.0 |
| $SiO_2$ | 1.60 |
| Fe-oxides (as $Fe_2O_3$) | 19.70 |
| $TiO_2$ | 2.60 |
| Loss of Ignition | 28.00 |
| Others | 0.10 |
| | 100 |

Figure 2:
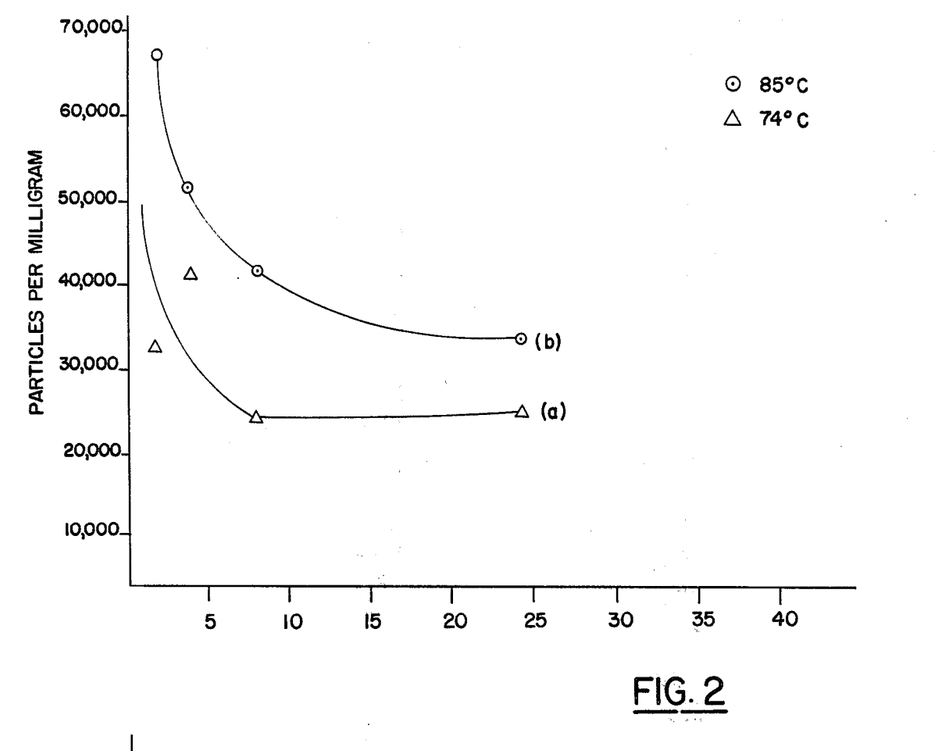
FIG. 2 provides a plot of alumina hydrate seed particle number decrease as a function of holding time in the "Agglomeration" section of the instant precipitation system under two different temperature conditions at constant A/C ratios and seed charges.

The pregnant liquor generated in digestion had a caustic concentration of 240 g/l expressed as $Na_2CO_3$ and an A/C ratio of 0.685. About 50% by volume of the pregnant liquor was charged to a series of batch-type precipitator vessels designated as the "Agglomeration" section of the system. These vessels were of conventional design and each of the precipitator vessels was equipped with means of agitation. Finely divided alumina hydrate (obtained from the "Seed Generation" stage of the system) was then added as seed to each precipitator vessel at a rate of about 135–145 g/l, calculated on the basis of the liquor volume in the vessel. The temperature in each vessel, after the addition of the seed hydrate (fill temperature), was established at about 74° C. and each vessel was then maintained under agitation for an average time period of about 8–16 hours. The holding time required to produce the desired alumina hydrate agglomerates at the given A/C ratio was preestablished by measuring and plotting the decrease in the number of alumina hydrate seed particles as a function of time in laboratory equipment approximating the conditions existing in the "Agglomeration" section. The plot, showing a particle number decrease from the initial 545,000 particles/mg to about 68,000 particles/mg (2 hours) and to about 24,000 particles/mg (final) after 24 hours, is depicted in FIG. 2. From FIG. 2, curve (a), it can be observed that at the 74° C. fill temperature employed and for the given A/C ratio, the original seed particle number/mg decreased within about eight hours to the lowest level and it stayed essentially at this level within the 8–24 hour period shown. For operational expediency in the plant, a holding time of about 8–16 hours was selected within the 2–24 hour range provided by the plot.

After the present holding time, the contents of the vessels were transferred to a conventional classifier, such as a cyclone, where the agglomerated particles were separated. The underflow, existing from the classifier consisted of a slurry of about 55% by weight solids content; and the solid alumina hydrate in this slurry had a screen distribution wherein about 90–98% by weight of the agglomerated hydrate particles had a size over 45 microns. This slurry, having an A/C ratio of about 0.475, was then charged to the "Growth" section of the precipitation system. The overflow from the classifier contained about 50–70 g/l hydrate of smaller particle size and this overflow was charged to the "Seed Generation" section as seed.

Figure 3:
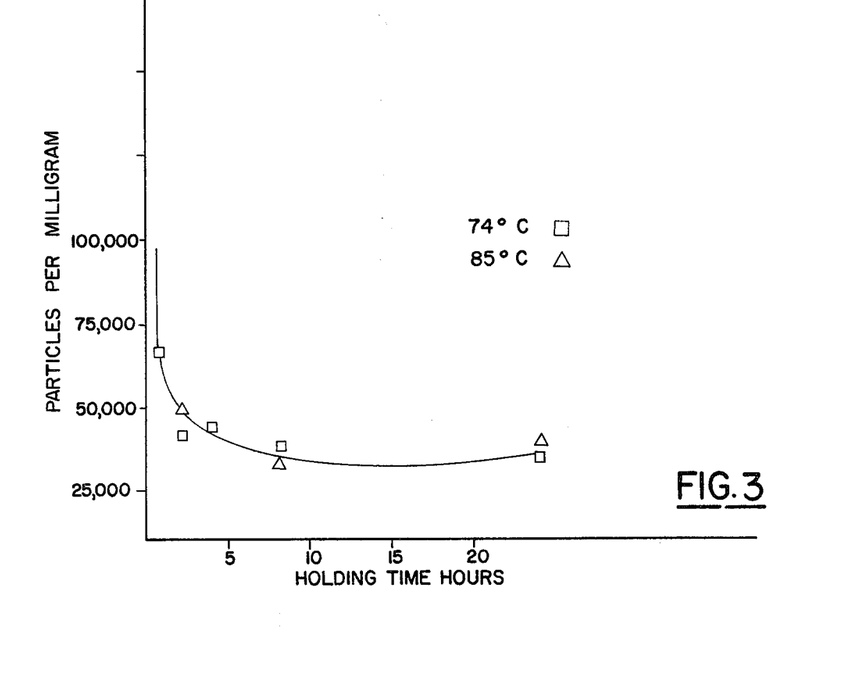
FIG. 3 shows a plot of the alumina hydrate seed particle number decrease as a function of holding time in the "Growth" section of the instant precipitation system at two different fill temperatures at constant A/C ratios and seed charges.

For the generation of strong, coarse alumina hydrate agglomerates in the "Growth" section of the system, a continuous line of precipitation vessels was utilized. Each vessel of the series was provided with means of agitation, for example, a mechanical stirrer or an airlift. In this line each vessel was connected to the next vessel by conventional overflow means which allowed the liquor and the seed charged to the first vessel of the line to reside in this "Growth" section for the present average holding time. The product, i.e., the strong and cemented agglomerate, was removed from the last vessel of the series, however, means were also provided to allow removal of cemented agglomerates from any vessel of the line. The first vessel of the continuous "Growth" stage was charged with pregnant liquor from digestion, this liquor having an A/C ratio of 0.685 and a caustic concentration, expressed as $Na_2CO_3$, of about 240 g/l. To the same vessel the underflow from the "Agglomeration" stage was added as seed at a rate of 100 g/l of pregnant liquor, as well as 100 g/l seed from the underflow of the "Seed Generation" stage to be discussed hereinafter. After addition of these seed charges the fill temperature in the entire series is established at about 77° C. under agitation. To determine the required average holding time in the series and thus establish the optimum conditions for the generation of strong, cemented hydrate particles, a plot was prepared by determining the decrease in seed particle number as a function of time at the given A/C ratio. The plot, which was used in setting the average holding time in the "Growth" section at about 8–20 hours, is shown in FIG. 3. Since in this section of the precipitation system the main function is to obtain strong particles of coarse grain distribution, the particle size distribution as a function of holding time was also established. It was found that if the average holding time in the continuous "Growth" section or stage is kept within the range of about 8–20 hours, about 90–98% by weight of the solids will have a particle size in excess of 45 microns. These particles, in addition to being coarse in grain size, exhibit excellent attrition resistance equivalent to or better than hydrate produced in the conventional manner; generally less than about 5% by weight of the charge fed to the calciner will break up during handling and calcination and subsequent handling to particles below the 45 micron size. It was further observed that as a result of the cooperative actions of the "Agglomeration" and "Growth" stages of the present precipitation system, only a very small percentage of the final alumina hydrate product exhibits a particle size below 20 micron size.

From the last vessel of the "Growth" section, slurry was continuously removed and chargedd to a classifier which in the instant case was a cyclone. The underflow from the cyclone had a solids content of about 55% by weight and the alumina hydrate product recovered from the underflow had a particle size distribution wherein about 98% by weight of the hydrate had a size in excess of 45 microns. The product recovered from the underflow was used as calciner feed for the production of reduction-grade Al$_2$O$_3$. The alumina hydrate yield in this section of the precipitation system was about 50 g/l.

The overflow from the classifier contained about 50-70 g/l hydrate and this liquor stream was charged to the third or "Seed Generation" section of the precipitation system together with the overflow from the classifier connected to the tail end of the "Agglomeration" section. The combined streams to the "Seed Generation" stage had an A/C ratio of 0.475 and a hydrate content of 50-70 g/l in the form of fine seed. In order to obtain the maximum quantity of precipitated alumina hydrate product from the "Seed Generation" section an additional quantity of seed hydrate was charged to this section which was operated in a continuous manner. The amount of additional seed was adjusted to obtain a total seed charge of about 140 g/l in the first few vessels of the continuous precipitator line. The fill temperature in the precipitators was set to about 60° C. and the average holding time in this stage was established under agitation to be in the range of about 8-24 hours.

When the desired quantity of precipitated seed hydrate was produced, the slurry now having a final A/C ratio of 0.350 was charged to a classifier where the coarser particles were separated from the finer particles. The coarser particles were then used as seed for the "Growth" section; while the overflow was clarified to produce a spent liquor containing less than 1 g/l solids content. The thickened alumina hydrate slurry recovered from the classifier was used as seed for the "Agglomeration" and "Seed Generation" stages.

Figure 4A:
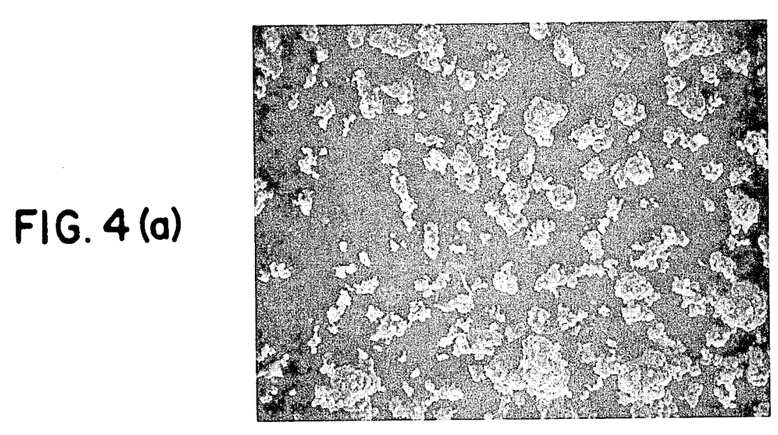
FIG. 4a shows the finely divided alumina hydrate produced in the "Seed Generation" section.
Figure 4B:
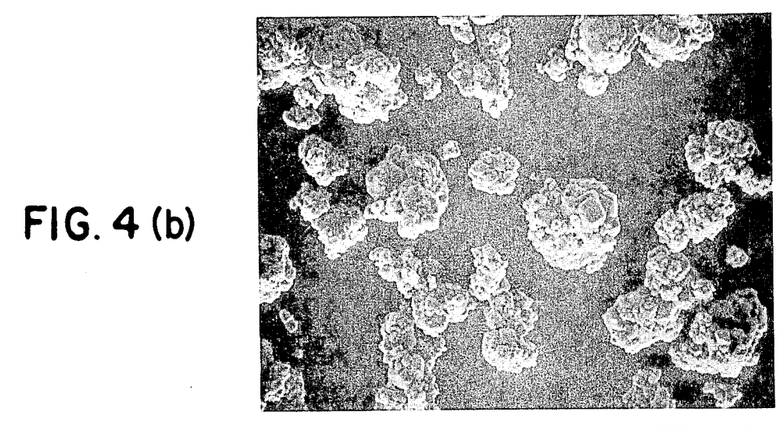
FIG. 4b indicates the increase in size of the finely divided particle as it leaves the "Agglomeration" stage.
Figure 4C:
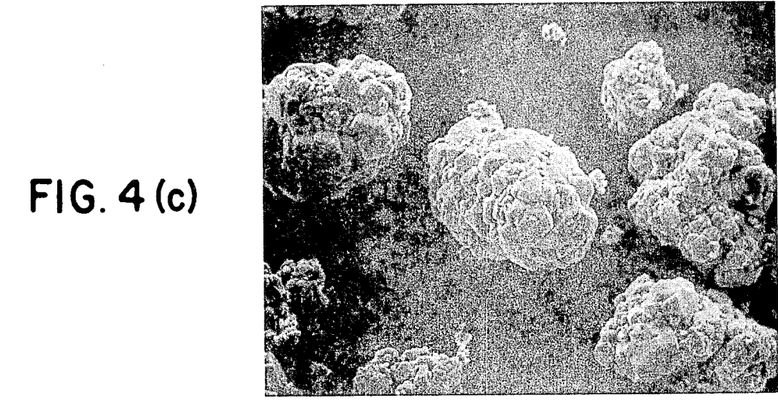
FIG. 4c depicts the strong and coarse alumina hydrate product obtained in the "Growth" section of the precipitation system.

To visually indicate the roles, the above-described three-stages play in the instant precipitation system, scanning electron micrograph (SEM) photographs are provided. FIG. 4a shows the finely divided alumina hydrate produced in the "Seed Generation" section of the system, FIG. 4b indicates the increase in size of the finely divided particle as it leaves the "Agglomeration" stage; and FIG. 4c depicts te cementing action, i.e., the densification of the agglomerates, achieved in the "Growth" section of the system. Apart from the particle size increase through the three-stage system, as shown in FIG. 4, the strengths of the particles have also increased as measured by attrition index. The strength increase is at least three-fold and under optimum conditions, such as provided by the operational limits described hereinbefore, even up to five times in comparison to the strength of the agglomrates recovered from the "Agglomeration" section.

As mentioned already, the instant process also provides a significant increase in yield. It can be observed from the above example that A/C ratio of the liquor charged to both the "Agglomeration" and the "Growth" sections was 0.685 while the A/C ratio of the liquor removed from the overflow of the classifier in the "Seed Generation" section was 0.350. This corresponds to a drop of 0.335 A/C at a slightly increasing caustic concentration and it signifies as alumina hydrate recovery of nearly 50% from the liquor. In comparison with the prior art "American Bayer" processes, this drop in A/C ratio is considerably higher than the values previously obtainable in a batch or continuous system at high caustic concentrations while producing a strong, coarse alumina hydrate.

EXAMPLE II

The precipitation system described in the previous example was used to carry out the process of the present invention at temperature falling within the operating ranges given but differing from the ones used above.

Thus, pregnant liquor having a caustic concentration of 240 g/l, expressed as Na$_2$CO$_3$ and an A/C ratio of 0.685, was charged to the "Agglomeration" section together with seed which was introduced at the rate of 140 g/l. The fill temperature in this section was established at 85° C. The average holding time in this section, required to form the desired alumina hydrate agglomerates, was derived from a test plot where the decrease in seed particle number was plotted versus the holding time. The results of the test are shown in FIG. 2, curve (b). From this curve an average holding time of 8-20 hours was selected. The slurry exiting from this section had an A/C ratio of 0.475 and the produced agglomerates were separated from the balance of the liquor in a classifier, wherein the underflow, containing the agglomerates and having a solids content of about 55% by weight, was introduced into the "Growth" section of the system, while the overflow, containing about 50-70 g/l alumina hydrate, was charged to the "Seed Generation" stage.

The "Growth" stage was supplied with pregnant liquor of 0.685 A/C ratio, as well as with the agglomerates from the previous stage. The caustic concentration in this stage was about 244 g/l. The agglomerates were added to the "Growth" section at the rate of 200 g/l and the fill temperature was established at 85° C. The necessary holding time at the fill temperature was experimentally established by plotting the decrease in particle number as a function of time. The plot is shown in FIG. 3 and was selected to be in the range of 8-20 hours. Subsequent to the required holding time, the slurry was pumped to a classifier where thed product hydrate was recovered from the underflow. The size distribution of the hydrate recovered was such that 98% by weight of the hydrate had a particle size in excess of 45 microns. In addition, attrition tests conducted with the product established that due to the high strength imparted to the hydrate during the "Growth" stage, break down of the hydrate during calcination would amount to an insignificant quantity, i.e., less than about 3% of the total product.

The overflow from this classifier, containing about 50-70 g/l hydrate and having an A/C ratio of 0.475, was charged to the "Seed Generation" section where the combined overflows from the "Agglomeration" and "Growth" sections were seeded with enough alumina hydrate seed to obtain a seed concentration level of 280 g/l in the last units of this section. The average holding time in this stage was 15-20 hours and the temperature was maintained at about 60° C. The slurry leaving the "Seed Generation" stage was subjected to classification; the underflow, containing mainly coarse hydrate, was used for seeding the "Growth" section, while the overflow having an A/C ratio of 0.350 was sent to evaporation-concentration. The yield from the precipitation system was, regardless of the variation in temperatures in the "Agglomeration" and "Growth" stages, increased.

In general, the present precipitation system, when operated within the parameters shown and described above provide strong, coarse alumina hydrate yields in the range of about 70-80 grams/liter. These yields, in combination with the improved physical characteristics of the hydrate product, provide a significantly improved precipitatiion system, hitherto unobtainable by conventional Bayer process operations.

Tests conducted by varying the A/C ratios in he three-stage system, while adjusting the seed charge quantity, holding times or fill temperatures, resulted in the same improved results when the operating conditions of the precipitation system were adjusted within the given parameters.

I claim:

1. In the Bayer process of producing alumina hydrate from bauxite wherein bauxite is digested with a caustic liquor at elevated temperatures and pressures to extract alumina values from the bauxite in the form of a pregnant caustic aluminate liquor and wherein alumina hydrate is recovered from the pregnant liquor by seeded precipitation, the improvement for obtaining a strong, coarse alumina hydrate product in increased yield which comprises:

(A) establishing three separate but interconnected precipitation stages for effecting agglomeration, growth and seed generation, carrying out each stage in a series of vessels;

(B) charging a portion of the pregnant liquor to the agglomeration stage, the liquor having an A/C ratio from about 0.575 to about 0.700 and a caustic concentration, expressed in grams/liter $Na_2CO_3$, from about 165 to about 300 g/l, adding alumina hydrate seed to the liquor in an amount from about 70 to about 140 g/l of liquor, maintaining the seeded liquor within the temperature range from about 74° to about 85° C. for a time period from about 8 to about 24 hours to precipitate alumina hydrate in a slurry form, removing the slurry and subjecting it to size classification to recover an overflow slurry fraction containing fine alumina hydrate particles and an underflow slurry fraction containing coarse alumina hydrate particles;

(C) charging another portion of the pregnant liquor to the growth stage, adding to the liquor the coarse alumina hydrate from step (B) and alumina hydrate seed thus forming a slurry, the combined hydrate amount added to the liquor being kept within the range of about 120–300 grams/liter of pregnant liquor, maintaining the slurry within the temperature range from about 74° to about 85° C. for a time period from about 8 to about 24 hours to allow precipitation of alumina hydrate and cementation of the seed and coarse alumina hydrate with newly precipitated alumina hydrate, removing the slurry and subjecting it to size classification to generate an overflow slurry fraction containing fine alumina hydrate particles and an underflow slurry fraction containing strong, coarse alumina hydrate product;

(D) charging to the seed generation stage at least one of the overflow slurry fractions generated in steps (B) or (C), adding seed and maintaining the slurry from about 6 to about 24 hours within the temperature range from about 57° to about 66° C., removing the slurry and subjecting it to size classification to obtain an underflow slurry fraction containing coarse alumina hydrate particles and an overflow slurry fraction containing fine alumina hydrate particles, charging the underflow slurry fraction to step (C) to form strong, coarse alumina hydrate product and charging the overflow slurry fraction to at least one of the steps (B) or (C) as seed.

2. Process according to claim 1, wherein the overflow slurry fractions from both steps (B) and (C) are charged to step (D).

3. Process according to claim 1, wherein the overflow slurry fraction from step (D) is charged as seed to both steps (B) and (C).

4. Process according to claim 1, wherein step (D) is also charged with a portion of pregnant liquor.

5. Process according to claim 1, wherein the steps (C) and (D) are operated in a continuous manner and step (B) is operated in a batch-wise manner.

* * * * *

UNITED STATES PATENT AND TRADEMARK OFFICE
CERTIFICATE OF CORRECTION

PATENT NO. : 4,305,913

DATED : December 15, 1981

INVENTOR(S) : Joseph L. Anjier

It is certified that error appears in the above-identified patent and that said Letters Patent are hereby corrected as shown below:

Column 5, line 20, "0.575 to 0.700" should be --0.575 to about 0.700--

Column 5, line 50, 'eration" shown' should be --eration" stage shown--

Column 7, line 55, "andd" should be --and--

Column 9, line 28, "Loss of Ignition" should be --Loss on Ignition--

Column 10, line 65 "chargedd" should be --charged--

Column 11, line 43 "te" should be --the--

Column 11, line 52, "agglomrates" should be --agglomerates--

Column 11, line 62, "signifies as alumina" should be --signifies an alumina--

Column 12, line 5, "temperature" should be --temperatures--

Column 12, line 38, "thed" should be --the--

Column 13, line 3, "precipitatiion" should be --precipitation--

UNITED STATES PATENT AND TRADEMARK OFFICE
CERTIFICATE OF CORRECTION

PATENT NO. : 4,305,913

DATED : December 15, 1981

INVENTOR(S) : Joseph L. Anjier

It is certified that error appears in the above—identified patent and that said Letters Patent is hereby corrected as shown below:

Column 13, line 5, "he" should be -- the --.

Signed and Sealed this

Twenty-fifth Day of May 1982

[SEAL]

Attest:

Attesting Officer

GERALD J. MOSSINGHOFF

Commissioner of Patents and Trademarks